May 15, 1928.
E. F. STEBLAY
SIGNALING DEVICE
Filed Feb. 1, 1928
1,669,679
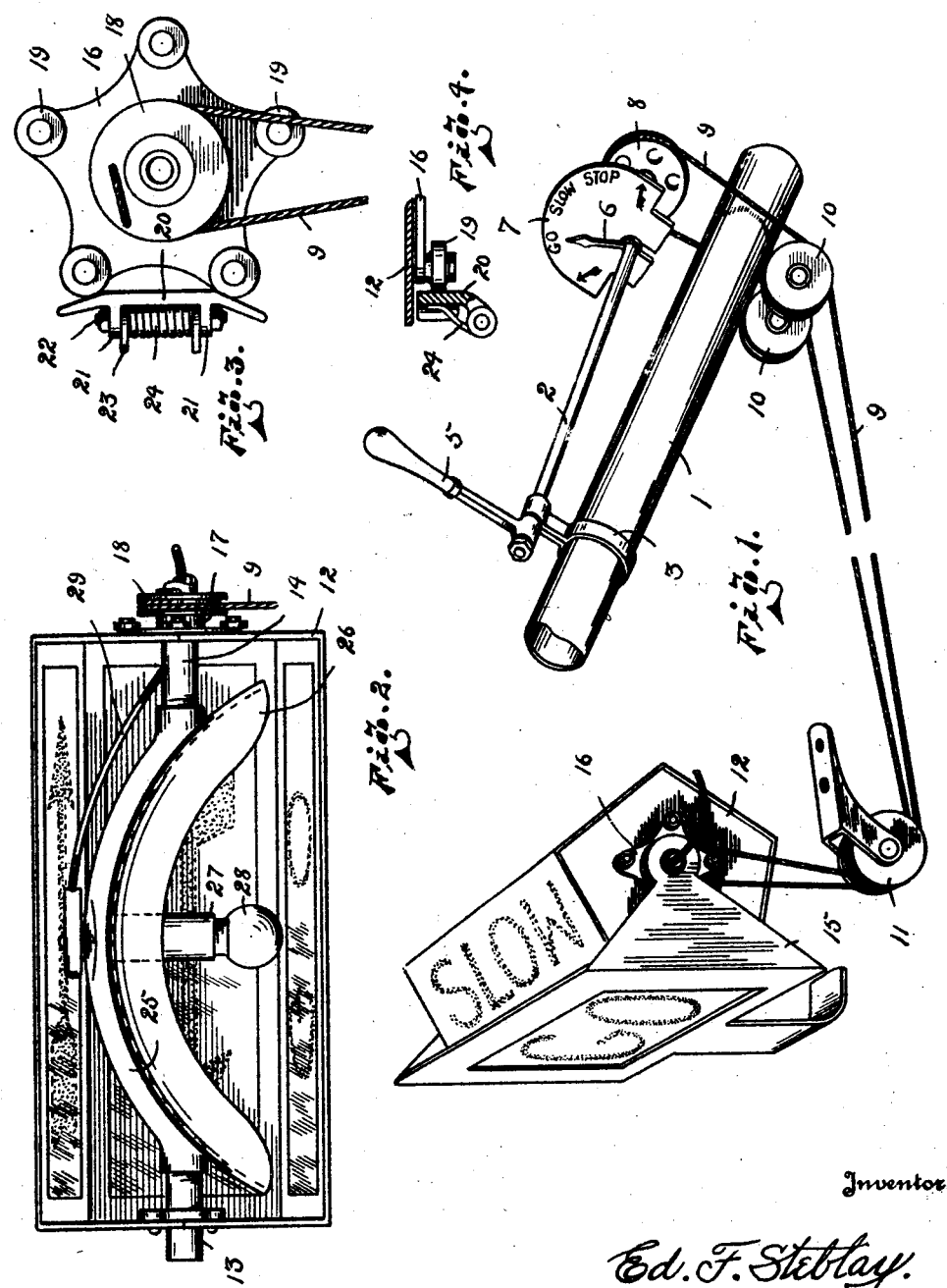
Inventor.
Ed. F. Steblay.
By Geo. Stevens.
Attorney Patented May 15, 1928.

1,669,679

UNITED STATES PATENT OFFICE.

EDWARD F. STEBLAY, OF DULUTH, MINNESOTA.

SIGNALING DEVICE.

Application filed February 1, 1928. Serial No. 251,054.

This invention relates to signaling devices for automobiles, the principal object being to provide a more practical and efficient device of this character.

Other objects and advantages of the invention will appear in the further description thereof.

Referring now to the accompanying drawing, forming part of this application, and wherein like reference characters indicate like parts:

Figure 1 is a perspective view of one of the improved devices as installed upon an automobile showing only those parts of the latter necessary for the installation;

Figure 2 is an enlarged top plan view of the lamp housing with the upper portion thereof removed;

Figure 3 is an enlarged end view of the automatic holding device for the lamp housing; and Figure 4 is a fragmental section through the spring controlled member of Figure 3.

The principal novel features of the device which contribute to its efficiency are the lamp housing and installation therefor, the manner of automatically maintaining the housing in a predetermined position, and the convenient location of the operating mechanism in respect to the position of the operator of the car.

1 represents the steering post of an automobile upon which and directly above same is installed the signal operating shaft 2, the uppermost end being journalled in a suitable clamping member 3 conveniently below the steering wheel, and the opposite end of the shaft 2 is journalled in a similarly shaped clamping member preferably below the instrument board, not here shown. A handle indicated at 5 is rigidly fixed to the upper end of the shaft 2 for rotating same, and just forwardly of or attached to the instrument board is installed the indicator quadrant 7 which is also preferably attached in any desired manner to the steering post 1. This indicator board or quadrant is generally semi-circular in shape and the major portion of its body extends above the shaft 2. Just inwardly of the indicator quadrant is installed an arrow 6 fixed to the shaft 2 so that when the shaft is rotated by the handle 5 the arrow will point to some one of the signaling indicia which is made to correspond with that displayed at the rear of the car.

A sheave 8 is fixed to the extreme lower end of the shaft 2 over which the signaling rope 9 passes and extends downwardly upon the under side of the steering post to and about a pair of guide sheaves 10 installed beneath the post and preferably beneath the floor boards of the car, from whence they lead to a second pair of guiding sheaves 11 installed below and in suitable proximity to the signal housing 12. This housing may be of any desired size or shape, but I prefer to employ a quinquangularly shaped device whose trunnions comprise hollow tubing as indicated at 13 and 14. As a supporting bracket for the signal housing I provide such a one as indicated at 15, made of sheet metal, the ends of which are bent at right angles and support the trunnions of the housing, while the face of the bracket is open to present as clearly as possible the signaling indicia as the housing is rotated. Upon the operated end of the housing is installed a quinquangular plate indicated at 16, having a hub-like portion 17 carrying the sheave 18 about which the endless operating rope 19 is engaged, the trunnions being mounted within the inturned ends of the bracket 15. Upon each of the five corners of the plate 16 is installed a roller 19, there being a pair of these aligned with each side of the housing so that when one face of the housing is disposed vertically within the opening of the bracket 15 a pair of the rollers will occur in vertical alignment one above the other, and within the path of the pair of rollers thus positioned is installed the spring controlled shoe 20 having two laterally extending spaced lugs 21 through which a suitable spindle 22 is installed, it also extending through the spaced lugs indicated at 23 attached to the inturned ends of the bracket 15 and between which lugs is the contractile spiral spring 24 an end of which is extended inwardly and bears against the back of the shoe 20 so as to exert a forward pressure on same at all times. Inasmuch as the extreme ends of the shoe are bent backwardly in respect to the rollers 19, and a pair of them will engage against the shoe 15 as shown, they will normally so remain by the pressure of the shoe thereagainst and hold one face of the signal housing in proper alignment with the bracket 15 as is obvious.

The trunnions 13 and 14 of the housing are screw-threadedly mounted within the opposite ends of the arcuately shaped light support 25 within the housing and to this support is fixed the arcuately shaped reflector 26 which is of thin sheet metal and concavo-convex in cross section, the surface facing the lamp being polished in any desired manner for reflecting the light against the exposed signal in the bracket 15. The lamp socket is indicated at 27, it carrying the lamp 28, and fixed to the support 25. At the rear of the socket the electric wire 29 extends into the hollow trunnion 14, thus forming a simple and effective installation for the signaling device.

Having thus described my invention, what I claim and desire to secure by Letters Patent, is:

1. A signaling device of the class described comprising in combination an operating shaft, an indicator associated therewith, a rotatable multi-faced signal housing remote from the shaft, means for transmitting motion from the shaft to the housing, lighting means within the housing, signaling indicia upon the housing corresponding with that upon the indicator, and means for automatically holding the signal in operative position, comprising a multi-cornered stop plate carried by said housing and cooperatively engageable with a spring controlled shoe, whereby the selective faces of the housing are held in vertical position.

2. A multi-faced signal housing of the type described comprising in combination a stationary shaft upon which the housing is rotatable, means for rotating the housing, a spring controlled stop plate carried by one end of the housing whereby the selective faces thereof are held in vertical position.

3. A multi-faced signal housing of the type described comprising in combination a stationary shaft upon which the housing is rotatable, lighting means carried by said shaft for projection through the selective faces of the housing, means for rotating the housing, a spring controlled stop plate carried by one end of the housing whereby the selective faces thereof are held in vertical position.

In testimony whereof I affix my signature.

EDWARD F. STEBLAY.